J. R. SLATON & J. M. WADLINGTON.
DITCHING-MACHINE.

No. 189,395. Patented April 10, 1877.

WITNESSES:
E. Wolff.
J. H. Scarborough

INVENTORS
Jas. R. Slaton.
J. M. Wadlington.
BY
Munn & Co.
ATTORNEYS.

N. PETERS, PHOTO-LITHOGRAPHER, WASHINGTON, D. C.

UNITED STATES PATENT OFFICE.

JAMES R. SLATON AND JOHN M. WADLINGTON, OF MORGANFIELD, KY.

IMPROVEMENT IN DITCHING-MACHINES.

Specification forming part of Letters Patent No. 189,395, dated April 10, 1877; application filed January 29, 1877.

*To all whom it may concern:*

Figure 1:
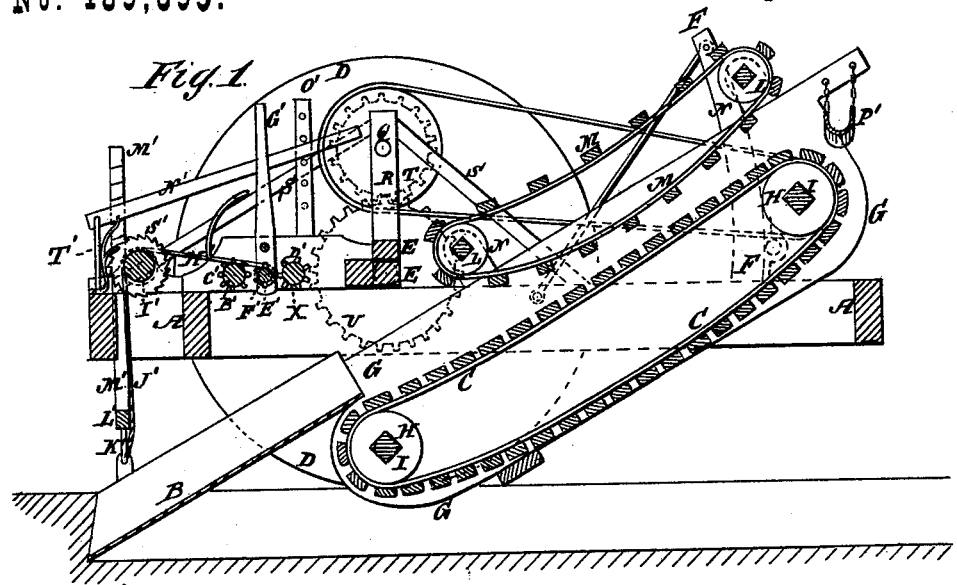
Figure 2:
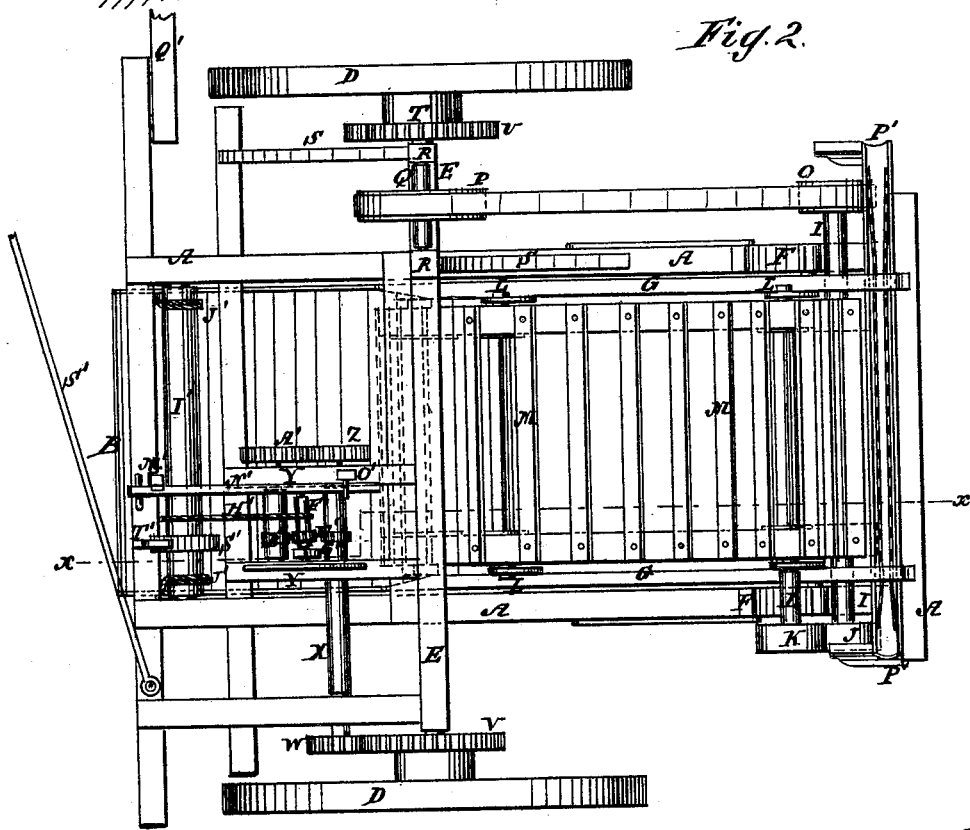

Be it known that we, JAMES R. SLATON and JOHN M. WADLINGTON, of Morganfield, in the county of Union and State of Kentucky, have invented a new and useful Improvement in Ditcher, of which the following is a specification:

Figure 1 is a vertical longitudinal section of our improved ditcher, taken through the line *x x*, Fig. 2. Fig. 2 is a top view of the same.

Similar letters of reference indicate corresponding parts.

The object of this invention is to furnish an improved machine for opening ditches of any desired depth and width, which may also be used with advantage for grading roads, and for various other purposes where soil is to be moved, and which shall be simple in construction, convenient in use, and effective in operation.

The invention consists in the construction and combination of parts, as hereinafter described and claimed.

D are the drive-wheels, which revolve upon the journals of the axle E. The axle E is spliced or made in two parts, secured to each other by bolts and stirrups or clips, so that the wheels D can be adjusted wider apart or closer together, according to the required width of the ditch, to enable the wheels to run upon the opposite sides of said ditch. To the axle E are bolted the side bars of the frame A, to the rear part of which, or to standards F attached to said rear part, is pivoted the rear part of the carrier-frame G. To the lower end of the carrier-frame G is secured the scraper or shovel B, the side parts of which are bent upward at right angles to keep the soil upon said scraper, and so that the forward edges of said side parts may serve as cutters to separate the slice from the sides of the ditch. The connection between the scraper B and the frame G of the lower carrier may be strengthened by brace-bars. C is the carrier, which is formed by attaching cross-bars to endless chains or belts passing around pulleys H attached to shafts I. The shafts I revolve in bearings in the frame G, and to the projecting journal of the rear shaft I is attached a pulley, J, around which passes an endless belt, that also passes around a pulley, K, attached to the projecting end of the journal of the rear shaft L of the upper carrier M. The carrier M is formed by attaching cross-slats to endless belts or chains that pass around pulleys N attached to the shafts L. The shafts L of the upper carrier M revolve in standards attached to the frame G of the lower carrier C. To the other end of the rear shaft I of the lower carrier C is attached a pulley, O, around which passes an endless belt, that also passes around a pulley, P, attached to the short shaft Q. The shaft Q revolves in bearings in standards R attached to the axle E, and strengthened by braces S attached to their upper ends and to the frame A. To the outer end of the shaft Q is attached a gear-wheel, T, the teeth of which mesh into the teeth of the gear-wheel U attached to the inner end of the hub of the wheel D. To the inner end of the hub of the other wheel D is attached a gear-wheel, V, the teeth of which mesh into the teeth of the gear-wheel W attached to the outer end of the shaft X. The shaft X revolves in bearings in bars Y attached to the cross-bars of the frame A, and to its inner end is attached a gear-wheel, Z, the teeth of which mesh into the teeth of the gear-wheel A' attached to the end of the shaft B'. The shaft B' also revolves in bearings in the bars Y. To the shafts B' X, between the bars Y, are attached gear-wheels C' D', into the teeth of one or the other of which meshes the teeth of the gear-wheel E' attached to the shaft F'. One end of the shaft F' revolves in bearings in one of the bars Y, and its other end revolves in bearings in the lower end of the lever G' pivoted to the other bar Y, so that by operating the said lever G', the gear-wheel E' may be thrown into gear with one or the other of the gear-wheels C' D', according as the shaft F' is required to be turned in one or the other direction. To the shaft F' is attached one end of a cord, H', the other end of which is attached to and wound around a shaft, I'. The shaft I' revolves in bearings attached to the forward end of the frame A, and to it, near its ends, are attached the ends of two cords, J', the other ends of which are attached to the forward ends of the sides of the scraper B, so that the said scraper may be raised or lowered by the advance of the machine, according as the lever G' is operated to throw the gear-wheel E' into gear with one or the other of the gear-wheels C' D'. To the shaft I' is attached a ratchet-wheel, S', with the teeth of which engages a spring-pawl, T', attached to the frame A, to hold the said shaft securely in any position into which it may be adjusted. To the forward ends of the sides of the scraper B are attached the lower ends of two rods, K', the upper ends of which are attached to the ends of a bar, L'. To the center of the cross-bar L' is attached the lower end of an upright bar, M', which projects above the frame A, and has notches formed in its side to receive the lever N'. The lever N' is pivoted to the frame A, or to a stud or staple attached to the said frame A. The lever N' passes back across an upright bar, O', attached to the frame A, and having pins attached to or notches formed in it, so as to lock the scraper in place and hold it down to its work in operating upon hard soil.

The upper carrier M is designed for use in opening deep ditches to prevent the soil, and especially clods and lumps, from sliding or rolling back.

As the soil reaches the upper end of the carrier C it passes into an inclined spout, P', by which it is conducted to the side of the ditch. The spout P' is suspended from arms formed upon or attached to the upper end of the carrier-frame G by rods, cords, or chains, so that it may be inclined in either direction to deposit the soil upon either side of the ditch, as may be desired. Q' are extension-bars, which are bolted to the end parts of the front cross-bar of the frame A, to correspond with the axle E E when said axle is extended. The tongue is attached to the front cross-bars of the frame A at their centers or toward their ends, as circumstances may require. When the tongue is attached to the front cross-bars of the frame A toward their ends, it is strengthened by a brace-rod, R', one end of which is attached to the frame A, and its other end to the said tongue.

Having thus described our invention, we claim as new and desire to secure by Letters Patent—

1. The combination of the gear-wheels U T and the pulleys P O J K with the drive-wheel D and the rear shafts of the carriers C M, substantially as herein shown and described.

2. The combination of the gear-wheels V W, the shafts X B' F', and their connecting-gearing, the lever G', the cord H', the shaft I', and the cords J', with the drive-wheel D, the frame A, and the scraper B, substantially as herein shown and described.

3. The combination of the extension-bars Q' with the front cross-bar of the frame A and the extensible axle F, substantially as herein shown and described.

JAMES R. SLATON.
JOHN M. WADLINGTON.

Witnesses:
HARDY C. DUVAL,
HENRY W. HARREL.